United States Patent [19]
Chu et al.

[11] Patent Number: 5,786,937
[45] Date of Patent: Jul. 28, 1998

[54] THIN-FILM COLOR-SELECTIVE BEAM SPLITTER AND METHOD OF FABRICATING THE SAME

[75] Inventors: Cheng-Wei Chu; Yi-Jen Tsou, both of Taipei; Fang Chuan Ho, Hsinchu, all of Taiwan

[73] Assignee: Industrial Technology Research Institute, Hsinchu, Taiwan

[21] Appl. No.: 682,447

[22] Filed: Jul. 17, 1996

[51] Int. Cl.$^6$ .............................. G02B 1/10; G02B 5/28; G02B 27/14; B05D 1/36
[52] U.S. Cl. .............. 359/583; 359/586; 359/587; 359/588; 359/589; 359/638; 359/834
[58] Field of Search .................. 359/638, 834, 359/583, 586, 587, 588, 589; 427/419.3

[56] References Cited

U.S. PATENT DOCUMENTS

| | | | |
|---|---|---|---|
| 2,189,932 | 2/1940 | Ball et al. | 359/638 |
| 4,171,869 | 10/1979 | Higuchi et al. | 348/259 |
| 4,507,679 | 3/1985 | Bendell | 348/238 |
| 5,339,158 | 8/1994 | Akiyama et al. | 348/757 |

Primary Examiner—Daivd C. Nelms
Assistant Examiner—Evelyn A. Lester
Attorney, Agent, or Firm—Ladas & Parry

[57] ABSTRACT

A thin-film color-selective beam splitter and the method of fabricating the same are disclosed. The method includes the steps of: (i) forming a main prism by a pre-selected material, and deciding a first base angle and a second base angle according to the substance and coating characteristics of the pre-selected material; (ii) coating a first multilayer film and a second multilayer film on two slopes of the main prism, in which tilt angles for coating the first multilayer film and the second multilayer film and tilt angles of light entering and emerging the main prism are different, so that spectra of the first multilayer film and the second multilayer film are different, and the first multilayer film can be a red reflective film and the second multilayer film can be a blue reflective film; and (iii) using the pre-selected material to form interface prisms, and adhering the interface prisms to the main prism, so that light can perpendicularly enter and emerge from surfaces of the prism. Moreover, the method may include a further step of: coating a filtering film on an emerging interface of the main prism for green light. A thin-film color-selective beam splitter can be formed by the above method with a single coating process and can serve as a tri-color beam splitter.

12 Claims, 8 Drawing Sheets

THIN-FILM COLOR-SELECTIVE BEAM SPLITTER AND METHOD OF FABRICATING THE SAME

BACKGROUND OF THE INVENTION

1. Field of the Invention

The present invention relates to a thin-film color-selective beam splitter and the method of fabricating the same. More particularly, the present invention relates to a thin-film color-selective beam splitter designed and fabricated by a single deposition process.

2. Description of Prior Art

Conventional thin-film beam splitters include the following: one is a combination of dichroic mirrors as shown in FIG. 1, which comprises a plurality of dichroic mirrors 10A to 10F and three light valves 11 to 13, in which the light emitted from the light source 5 first passes a filter 15 to filter out UV and IR rays, then the red, blue and green lights can be obtained through splitting by the dichroic mirrors and filtering by the light valves; another one is made of four dichroic mirrors arranged in an X-shape as shown in FIG. 2, which is U.S. Pat. No. 5,339,158 disclosed by M. Akiyama et al.; and the other one is a set of prisms which comprises at least two thin-film beam splitters; however, this approach suffers from low yield and high cost since at least two thin-film beam splitters have to be coated, and the thin-film systems are complex and are hard to fabricate.

The prisms usually used in color TV cameras, such as U.S. Pat. No. 4,171,869 by T. Higuchi et al. and U.S. Pat. No. 4,507,679 by S. L. Bendell, are improved, based on the approach of FIG. 3. This approach uses air gap 20 to cause red light to be totally reflected. This, however, increases the difficulty of prism assembly.

SUMMARY OF THE INVENTION

Accordingly, the object of the present invention is to provide a thin-film color-selective beam splitter and the method of fabricating the same, which can be accomplished by utilizing only one coating process.

Another object of the present invention is to provide a thin-film color-selective beam splitter, which has no air gap therein, therefore, the system quality is hardly deteriorated due to prism assembly.

Still another object of the present invention is to provide a method for fabricating a thin-film color-selective beam splitter, which can facilitate the fabricating process and increase the yield.

To achieve the above objects, the present invention mainly adopts the theory of thin-film tilt-angle coating and the principle that the spectrum of a thin-film system shifts to the shorter wavelength region when the incident angle increases. Thus, a main prism is selected. And the base angles of the main prism are decided by the prism material and the coating characteristics. Two multilayer thin-films formed on the main prism generate different spectra since the tilt angles of coating and the incident angles of light are different. Separation of three color can be attained by utilizing the two multilayer thin-films.

BRIEF DESCRIPTION OF THE DRAWINGS

The following detailed description, given by way of an example but not intended to limit the invention solely to the embodiments described herein, will be best understood in conjunction with the accompanying drawings in which.

DETAILED DESCRIPTION OF THE PREFERRED EMBODIMENTS

Figure 1:
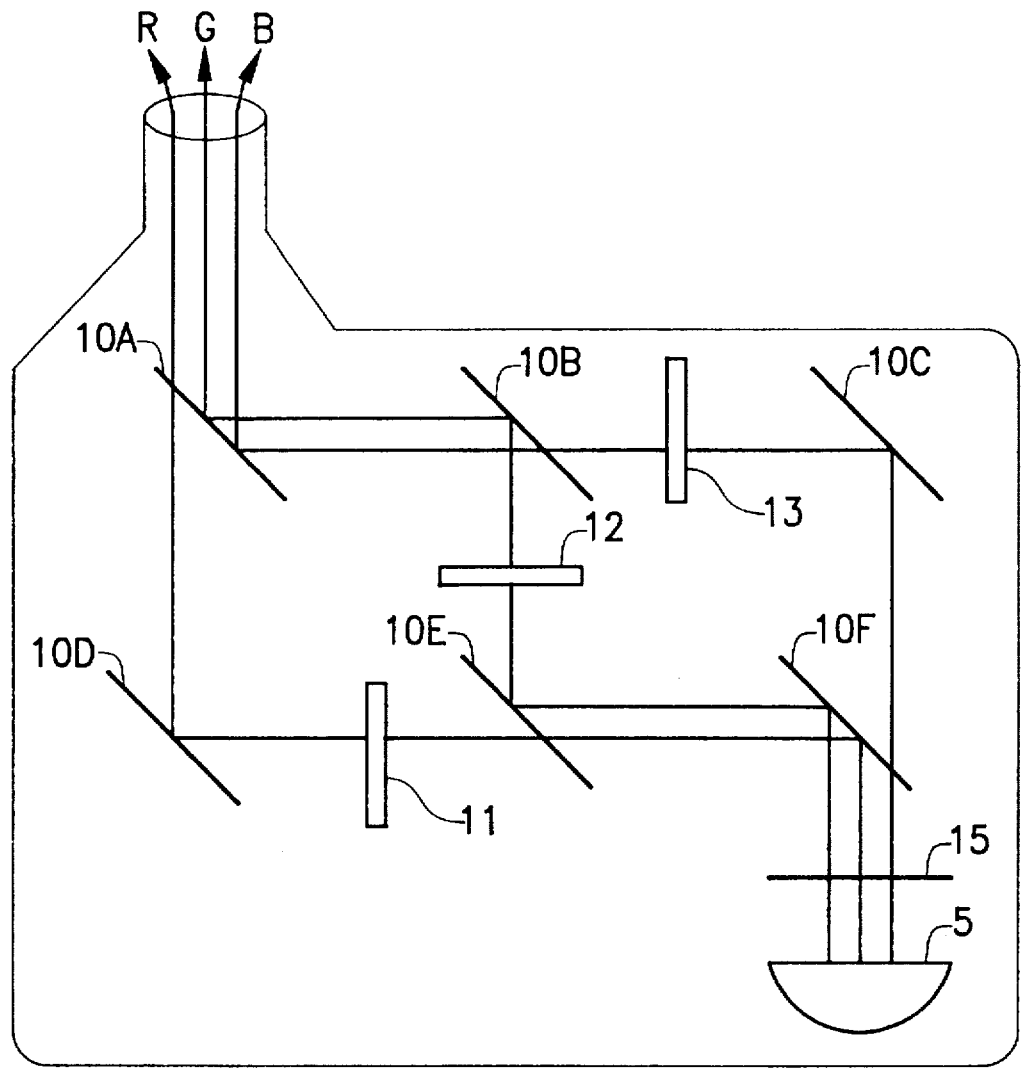
FIG. 1 illustrates the structure of a prior-art color-selective beam splitter.
Figure 2:
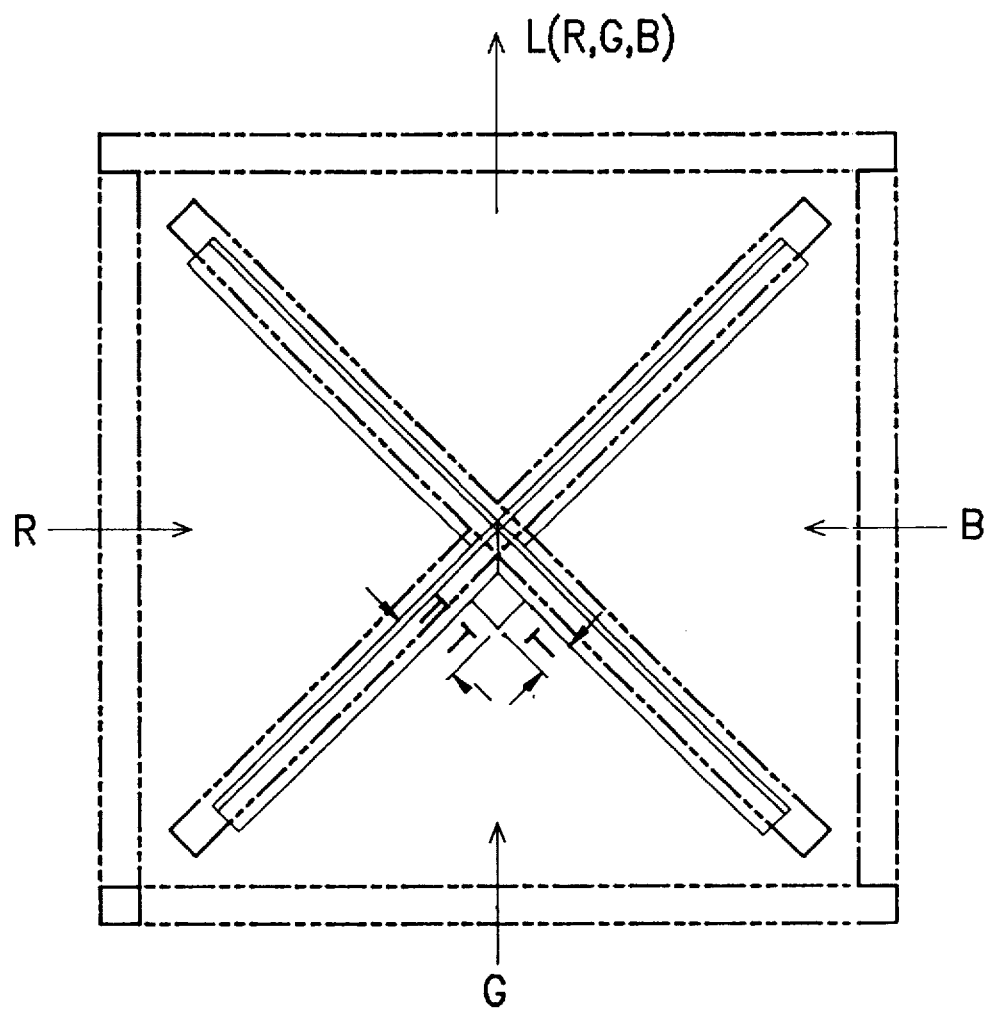
FIG. 2 illustrates the structure of another prior-art color-selective beam splitter.
Figure 3:
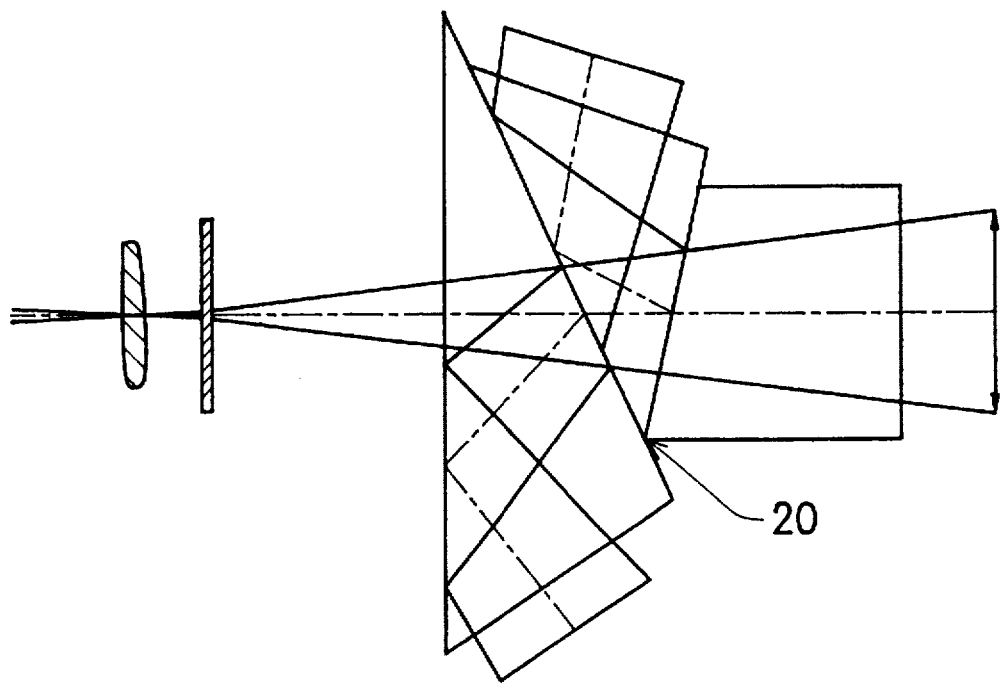
FIG. 3 illustrates the structure of still another prior-art color-selective beam splitter.
Figure 4A:
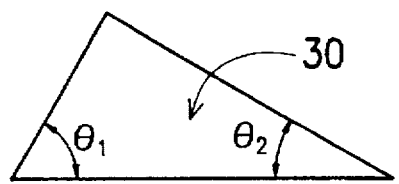
FIG. 4a to 4d are diagrams schematically illustrating the system construction of the present invention.
Figure 4B:
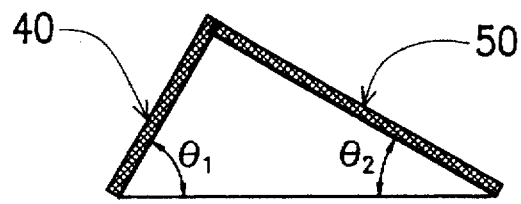
Figure 4C:
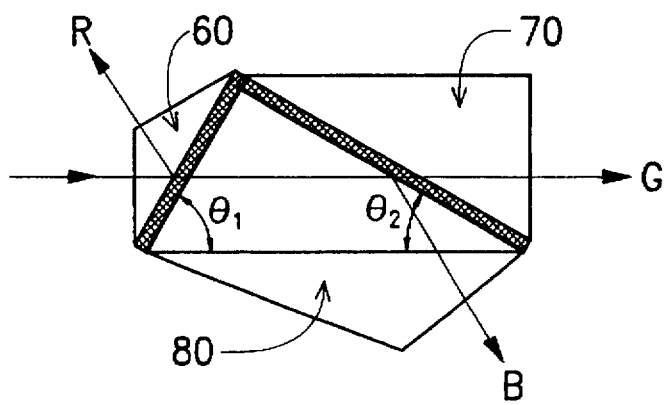
Figure 4D:
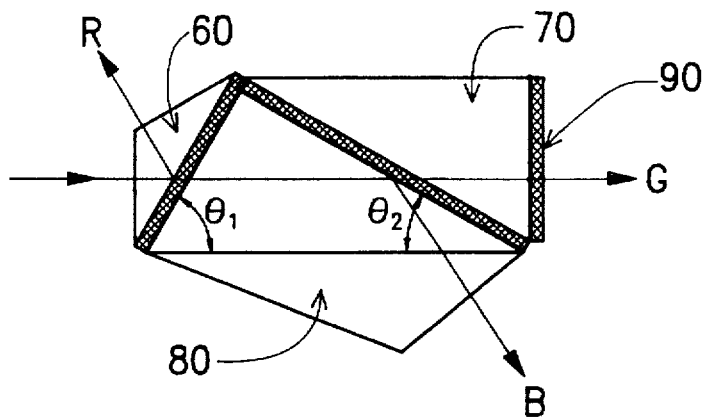

Referring to FIG. 4a to 4d, the fabricating method of the thin-film color-selective beam splitter includes the following steps of: (1) as shown in FIG. 4a, selecting a proper material to form a main prism 30, and deciding the base angles $\theta_1$ and $\theta_2$ according to the composition and the coating characteristics of the main prism 30; (2) as shown in FIG. 4b, designing and coating two multilayer thin-films 40 and 50 on two slopes of the main prism 30, wherein the two multilayer thin-films 40 and 50 formed on the main prism 30 generate different spectra since the tilt angles of coating and the incident angles of light are different. For example, the multilayer thin-film 40 can be a red light reflective mirror for reflecting red light R and the multilayer thin-film 50 can be a blue light reflective mirror for reflecting blue light B; (3) as shown in FIG. 4c, selecting interface prisms 60, 70 and 80 having the same composition as the main prism 30, and adhering the interface prisms 60, 70 and 80 on the two slopes and the bottom of the main prism 30, respectively, so that the light can emit from the prisms perpendicularly; (4) coating a filtering film 90 on the emitting interface of green light G. Thus, a simple thin-film color-selective beam splitter can be provided with high quality.

In the fabrication method mentioned above, the option of prism material and base angles mainly depends on the thin film tilt-angle coating theory and the principle that the spectrum of thin-film system shifts to the shorter wavelength region when the incident angle of light increases.

Figure 5:
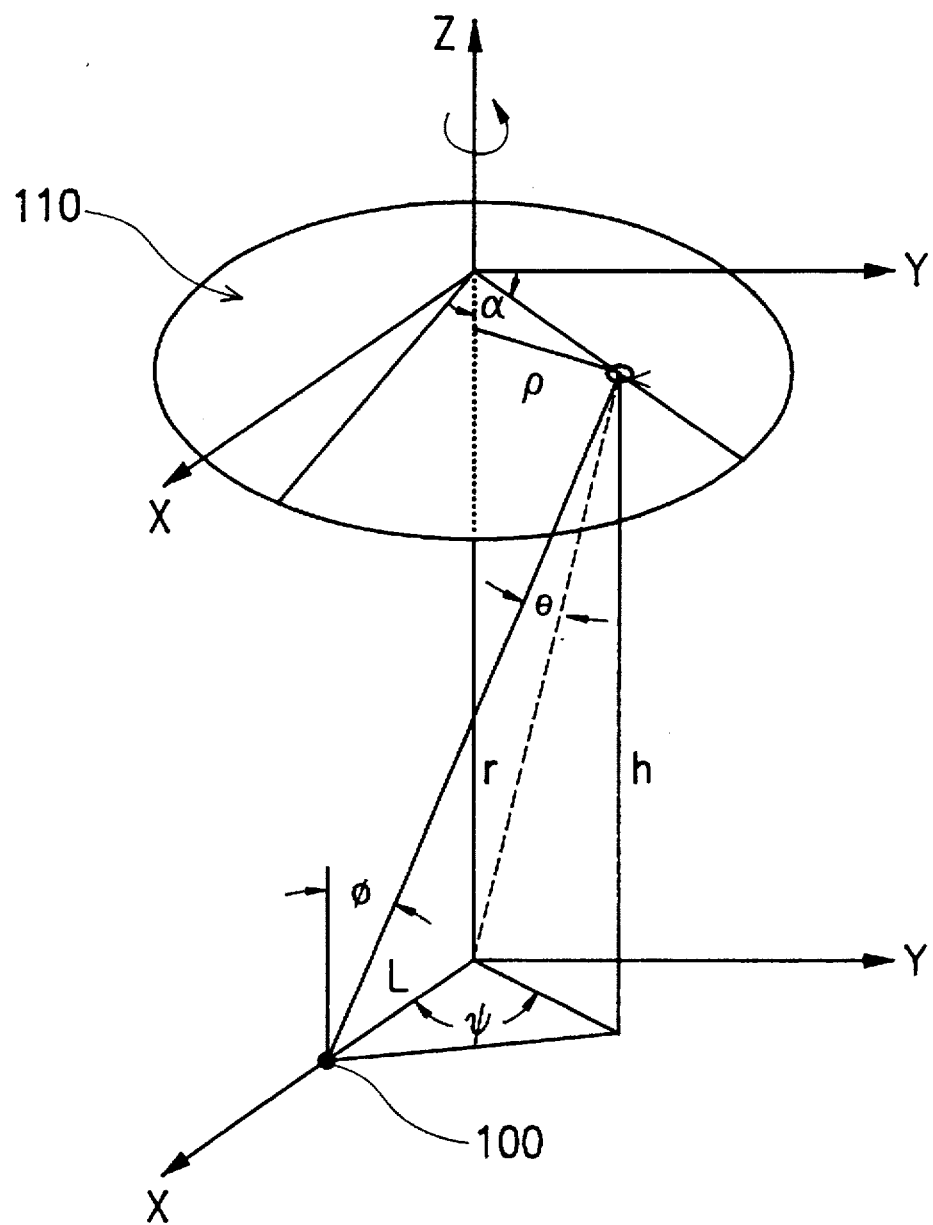
FIG. 5 is a diagram illustrating the geometric relation of the off-axial evaporating source and the rotating conical substrate clamp.

Referring to FIG. 5, the thickness of thin-film on the substrate evaporated in high vacuum from the evaporating source 100 is supposed to be d, wherein:

$$d = \frac{m(n+1)}{2\pi\mu} \frac{\cos^n\phi\cos\theta}{r^2}$$

In the above equation, m represents the total mass evaporated from the evaporating source, µ represents the density of the thin film, and n is a factor for determining the right proportion of evaporated molecular gas distribution. For a conical substrate clamp 110, which rotates with respect to z-axis, as shown in FIG. 5, the thickness distribution t of the thin film on the substrate is obtained as $$t = \frac{m(n+1)}{2\pi^2\mu} \int_0^\pi \frac{h^n[(\rho - L\cos\psi)\cos\alpha + h\sin\alpha]}{[h^2 + \rho^2 + L^2 - 2L\rho\cos\psi]^{(n+3)/2}} d\psi$$

Figure 6:
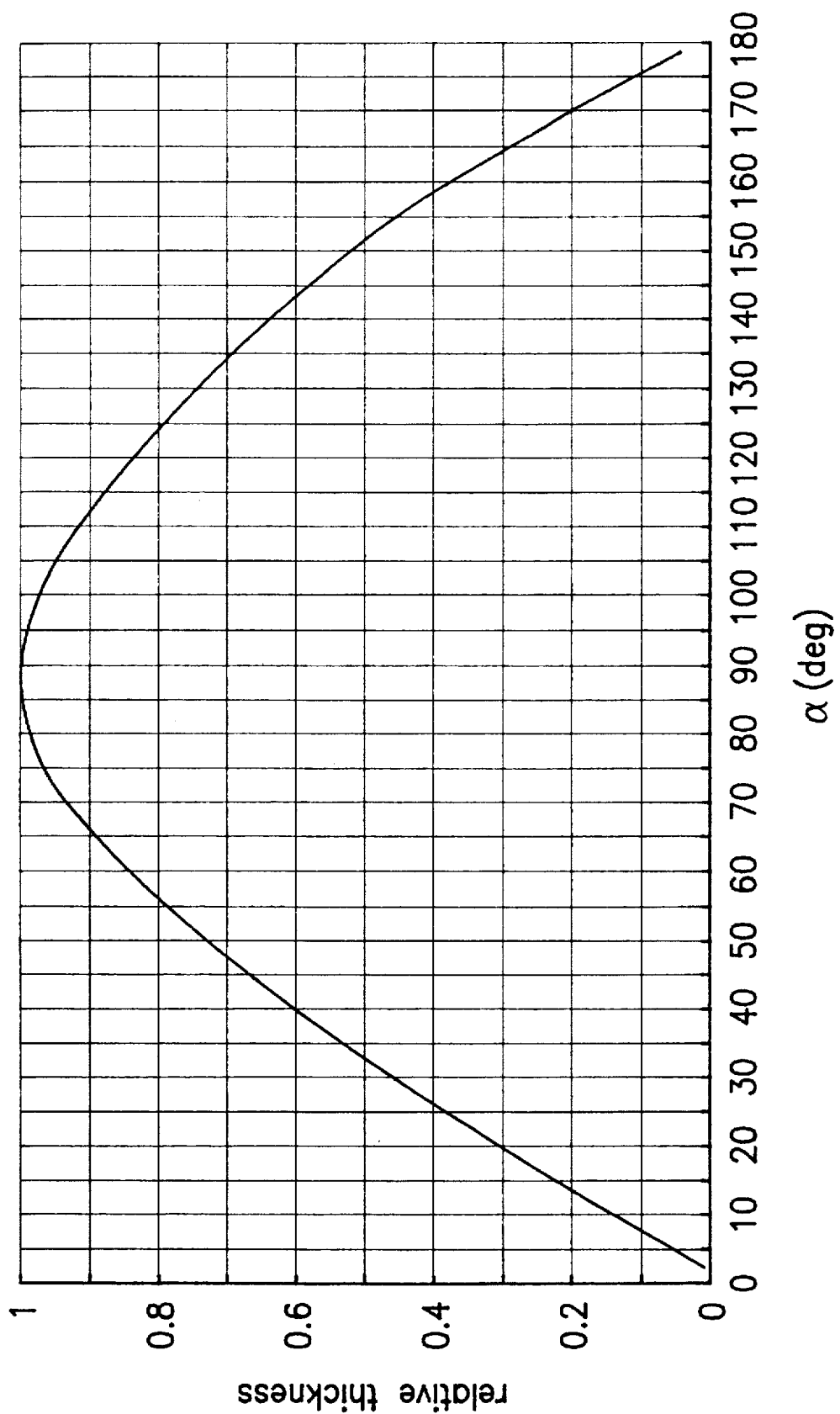
FIG. 6 is a curve diagram illustrating the relation of the thickness ratio of thin-films on the substrate and the tilt angle of the substrate.

According to the above equation, the thickness variation of the thin film while the substrate has a tilt angle a relative to the horizontal can be analyzed. The variation curve diagram is as shown in FIG. 6, in which ρ=50 mm, n=2.2, L=250 mm and h=700 mm.

Moreover, a red reflective multilayer coating can be designed as composed of symmetrical multilayers. Optimized and coated according to the variation curve of FIG. 6 and the principle that the spectrum of interfering optical thin-film will shift to the shorter wavelength region while the incident angle of light increases, a red reflective multilayer film can be obtained on one slope of the main prism, and a blue reflective multilayer film can be obtained on the other slope of the main prism. Thus, the light transmitted through the prism is green light. Therefore, the tri-color beam splitter of the present invention can be accomplished by one coating process.

Figure 7:
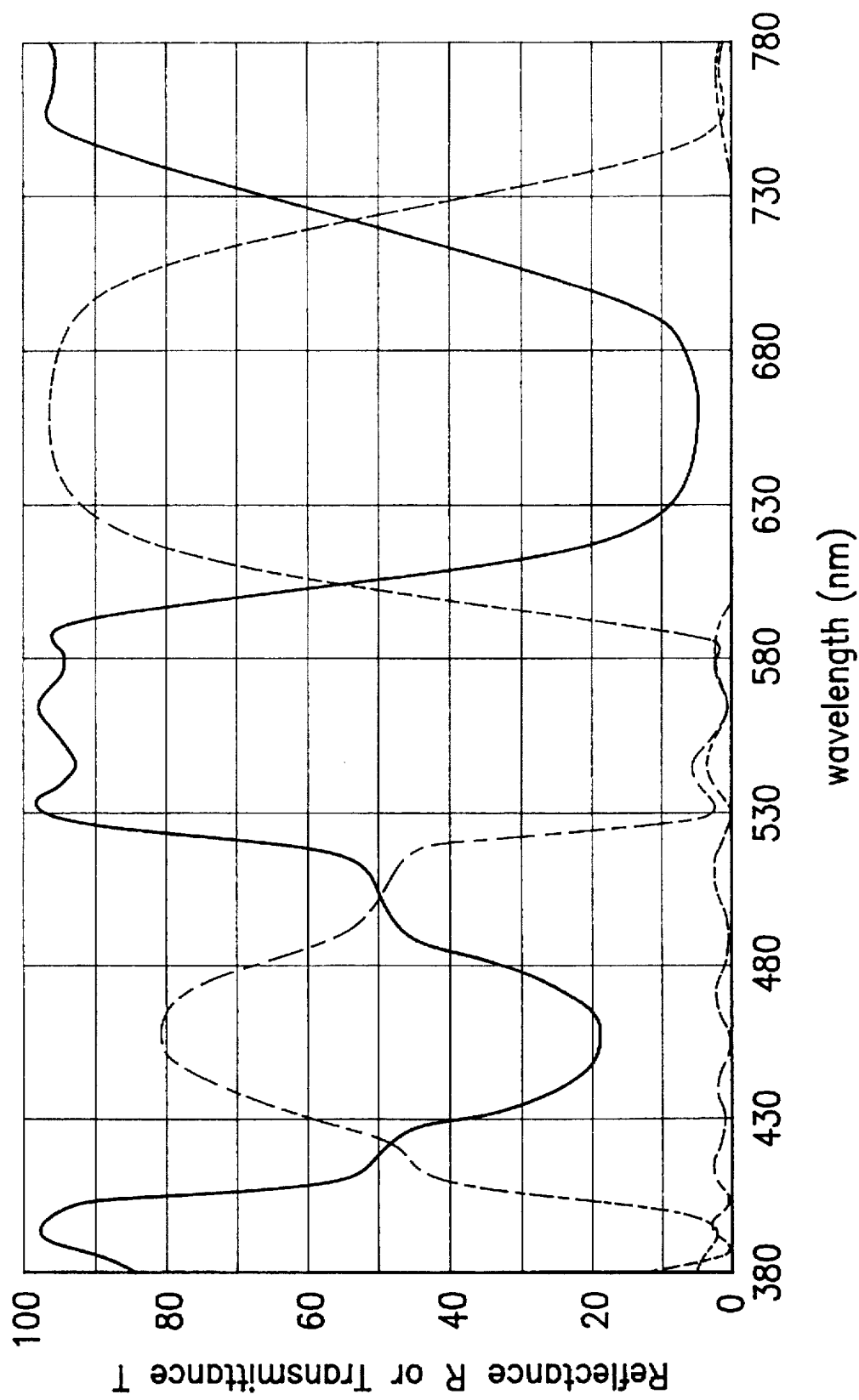
FIG. 7 illustrates a spectral diagram of three color separated by one preferred embodiment of the present invention.

Next, a practical process for fabricating a thin-film color-selective beam splitter according to one preferred embodiment of the present invention is given, which includes the following steps: (1) BK7 glass is used as the substance of the main prism, of which the base angles are designated to be $\theta_1=30°$ and $\theta_2=45°$. (2) $ZrO_2$ is used as the high refractive index material and $Al_2O_3$ is used as the low refractive index material, and a red reflective multilayer coating is formed according to the symmetrical multilayers principle, in which the multilayers are (L/2 H L/2)ⁿ and the reference wavelength is 729 nm. (3) The multilayer design is optimized by computer-aid, so that the multilayers can be formed as a red reflective multilayer coating while the incident angle is 30° and the reference wavelength is 729 nm, and formed as a blue reflective multilayer coating while the incident angle is 45°. The transmitting light is therefore green light. The multilayer structure is listed in the following Table 1, the obtained tri-color spectrum is illustrated in FIG. 7, wherein the solid line represents the transmittance of green light, the dashed line represents the reflectance of red light and the alternate long and short dashed line represents the reflectance of blue light. The corresponding CIE values are listed in Table 2.

TABLE 1

| LAYER | MATERIAL | GEOMETRIC THICKNESS nm | OPTICAL THICKNESS QWOT | REFRACTIVE INDEX $\lambda_0$ = 729 nm |
|---|---|---|---|---|
| SUBSTRATE | BK7 | | | 1.5122 |
| 1 | $Al_2O_3$ | 85.31 | 0.7583 | 1.62 |
| 2 | $ZrO_2$ | 119.28 | 1.3417 | 2.05 |
| 3 | $Al_2O_3$ | 16.04 | 0.1426 | 1.62 |
| 4 | $ZrO_2$ | 140.39 | 1.5791 | 2.05 |
| 5 | $Al_2O_3$ | 54.98 | 0.4887 | 1.62 |
| 6 | $ZrO_2$ | 136.96 | 1.5406 | 2.05 |
| 7 | $Al_2O_3$ | 47.01 | 0.4179 | 1.62 |
| 8 | $ZrO_2$ | 119.37 | 1.3427 | 2.05 |
| 9 | $Al_2O_3$ | 100.16 | 0.8903 | 1.62 |
| 10 | $ZrO_2$ | 91.84 | 1.0330 | 2.05 |
| 11 | $Al_2O_3$ | 112.51 | 1.0001 | 1.62 |
| 12 | $ZrO_2$ | 83.59 | 0.9403 | 2.05 |
| 13 | $Al_2O_3$ | 113.82 | 1.0117 | 1.62 |
| 14 | $ZrO_2$ | 92.47 | 1.0401 | 2.05 |
| 15 | $Al_2O_3$ | 111.36 | 0.9899 | 1.62 |

TABLE 1-continued

| LAYER | MATERIAL | GEOMETRIC THICKNESS nm | OPTICAL THICKNESS QWOT | REFRACTIVE INDEX $\lambda_0$ = 729 nm |
|---|---|---|---|---|
| 16 | $ZrO_2$ | 88.67 | 0.9974 | 2.05 |
| 17 | $Al_2O_3$ | 102.31 | 0.9094 | 1.62 |
| 18 | $ZrO_2$ | 95.71 | 1.0766 | 2.05 |
| 19 | $Al_2O_3$ | 109.83 | 0.9763 | 1.62 |
| 20 | $ZrO_2$ | 108.70 | 1.2227 | 2.05 |
| 21 | $Al_2O_3$ | 61.20 | 0.5440 | 1.62 |
| 22 | $ZrO_2$ | 108.01 | 1.2149 | 2.05 |
| 23 | $Al_2O_3$ | 114.87 | 1.0211 | 1.62 |
| 24 | $ZrO_2$ | 120.68 | 1.3574 | 2.05 |
| 25 | $Al_2O_3$ | 20.98 | 0.1865 | 1.62 |
| 26 | $ZrO_2$ | 115.30 | 1.2969 | 2.05 |
| 27 | $Al_2O_3$ | 77.20 | 0.6862 | 1.62 |
| BK7 | | | | 1.5122 |

TABLE 2

| | x | y | L (%) |
|---|---|---|---|
| R | 0.656 | 0.314 | 15.71 |
| G | 0.331 | 0.466 | 74.201 |
| B | 0.138 | 0.118 | 11.912 |

Figure 8:
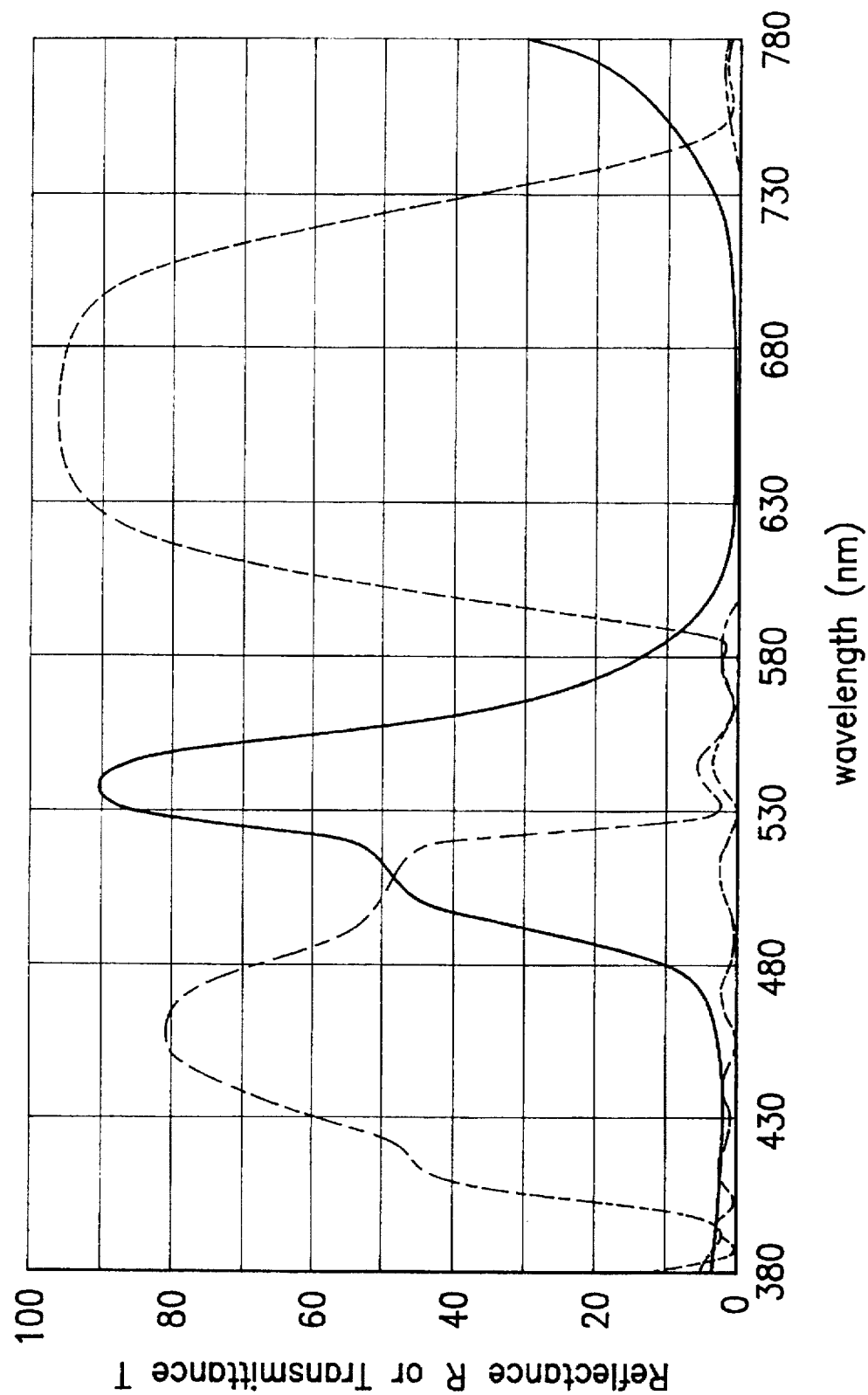
FIG. 8 illustrates a modified spectral diagram according to the spectrum of FIG. 7.

(4) According to FIG. 5 and FIG. 6, the multilayers listed in Table 1 are coated on the two slopes when the tilt angles for coating multilayers on the two slopes are selected to be respectively 45° and 120°. (5) Two BK7-make prisms are used as interface prisms 60 and 70 of FIG. 4c, and are adhered to the main prism 30, so that the incident light, the reflected light and the transmitted light can perpendicularly enter and emerge the prism. If $\theta_2$ is not 45°, a further EK7-make prism 80 has to be adhered to the bottom of the main prism 30. Furthermore, if a purer green light is desired, a filtering coating 90 can be coated on the emerging interface of the green light. The structure of the filtering coating 90 is listed in Table 3. The tri-color spectrum finally obtained is illustrated in FIG. 8, wherein the solid line represents the transmittance of green light, the dashed line represents the reflectance of red light and the alternate long and short dashed line represents the reflectance of blue light. The corresponding CIE values are listed in Table 4.

TABLE 3

| LAYER | MATERIAL | GEOMETRIC THICKNESS nm | OPTICAL THICKNESS QWOT | REFRACTIVE INDEX $\lambda_0$ = 729 nm |
|---|---|---|---|---|
| SUBSTRATE | Air | | | 1.0 |
| 1 | $SiO_2$ | 56.03 | 0.5 | 1.4501 |
| 2 | $TiO_2$ | 72.74 | 1.0 | 2.2340 |
| 3 | $SiO_2$ | 112.07 | 1.0 | 1.4501 |
| 4 | $TiO_2$ | 72.74 | 1.0 | 2.2340 |
| 5 | $SiO_2$ | 112.07 | 1.0 | 1.4501 |
| 6 | $TiO_2$ | 72.74 | 1.0 | 2.2340 |
| 7 | $SiO_2$ | 112.07 | 1.0 | 1.4501 |
| 8 | $TiO_2$ | 72.74 | 1.0 | 2.2340 |
| 9 | $SiO_2$ | 112.07 | 1.0 | 1.4501 |
| 10 | $TiO_2$ | 72.74 | 1.0 | 2.2340 |
| 11 | $SiO_2$ | 112.07 | 1.0 | 1.4501 |
| 12 | $TiO_2$ | 72.74 | 1.0 | 2.2340 |
| 13 | $SiO_2$ | 56.03 | 0.5 | 1.4501 |
| 14 | $TiO_2$ | 22.91 | 0.315 | 2.2340 |
| 15 | $SiO_2$ | 70.60 | 0.63 | 1.4501 |
| 16 | $TiO_2$ | 45.82 | 0.63 | 2.2340 |
| 17 | $SiO_2$ | 70.60 | 0.63 | 1.4501 |

TABLE 3-continued

| LAYER | MATERIAL | GEOMETRIC THICKNESS nm | OPTICAL THICKNESS QWOT | REFRACTIVE INDEX $\lambda_o = 729$ nm |
|---|---|---|---|---|
| 18 | $TiO_2$ | 45.82 | 0.63 | 2.2340 |
| 19 | $SiO_2$ | 70.60 | 0.63 | 1.4501 |
| 20 | $TiO_2$ | 45.82 | 0.63 | 2.2340 |
| 21 | $SiO_2$ | 70.60 | 0.63 | 1.4501 |
| 22 | $TiO_2$ | 45.82 | 0.63 | 2.2340 |
| 23 | $SiO_2$ | 70.60 | 0.63 | 1.4501 |
| 24 | $TiO_2$ | 22.91 | 0.315 | 2.2340 |
|  | BK7 |  |  | 1.5145 |

TABLE 4

|  | x | y | L (%) |
|---|---|---|---|
| R | 0.656 | 0.314 | 15.71 |
| G | 0.237 | 0.650 | 39.615 |
| B | 0.138 | 0.118 | 11.912 |

In the fabricating process above, the selected multilayers in step 2 can be replaced by combinations of different high and low refractive index materials. For example, the high refractive index material can be $TiO_2$, $Ta_2O_5$, $CeO_2$ and ZnS the low refractive index material can be $SiO_2$ and $MgF_2$.

Moreover, different substances, such as PMMA, being used as the substrate and different base angles $\theta_1$ and $\theta_2$ can match with different multilayer coatings. Then, with different tilt angles for coating and following the steps of the above fabricating process, different thin-film color-selective beam splitters can be made to meet the requirements of different optical systems.

While the present invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A method for fabricating a thin-film color-selective beam splitter, comprising the steps of:
   (i) forming a main prism by a pre-selected material, and deciding a first base angle and a second base angle in accordance with substance and coating characteristics of the pre-selected material;
   (ii) by a single deposition process, coating a first multilayer film and a second multilayer film on two slopes of the main prism, in which tilt angles for coating the first multilayer film and the second multilayer film and angles of light entering and emerging the main prism are different, so that spectra of the first multilayer film and the second multilayer film are different, and the first multilayer film can be a red reflective film and the second multilayer film can be a blue reflective film; and
   (iii) using the pre-selected material to form interface prisms, and adhering the interface prisms to the main prism, so that light can perpendicularly enter and emerge surfaces of the main prism.

2. A fabricating method as claimed in claim 1, further comprising the step of:
   coating a filtering film on an emerging interface of the main prism for green light.

3. A fabricating method as claimed in claim 1, wherein the first base angle is 30° and the second base angle is 45°.

4. A fabricating method as claimed in claim 1, wherein the pre-selected material is BK7 glass.

5. A fabricating method as claimed in claim 1, wherein the first multilayer film and the second multilayer film are designed as symmetrical multilayers and formed by using $ZrO_2$ and $Al_2O_3$ as high refractive index material (H) and low refractive index material (L), respectively.

6. A fabricating method as claimed in claim 1, wherein the tilt angles for coating the first multilayer film and the second multilayer film are 45° and 120°, respectively.

7. A fabricating method as claimed in claim 2, wherein the first base angle is 30° and the second base angle is 45°.

8. A fabricating method as claimed in claim 2, wherein the pre-selected material is BK7 glass.

9. A fabricating method as claimed in claim 2, wherein the first multilayer film and the second multilayer film are designed as symmetrical multilayers and formed by using $ZrO_2$ and $Al_2O_3$ as high refractive index material (H) and low refractive index material (L), respectively.

10. A fabricating method as claimed in claim 2, wherein the tilt angles for coating the first multilayer film and the second multilayer film are 45° and 120°, respectively.

11. A fabricating method as claimed in claim 5, wherein a configuration of the symmetrical multilayers is $(L/2 \ H \ L/2)^{13}$.

12. A fabricating method as claimed in claim 9, wherein a configuration of the symmetrical multilayers is $(L/2 \ H \ L/2)^{13}$.

* * * * *